Sept. 2, 1941.  J. L. HARRIS  2,254,960
TEMPERATURE REGULATOR
Filed July 25, 1938  2 Sheets-Sheet 1
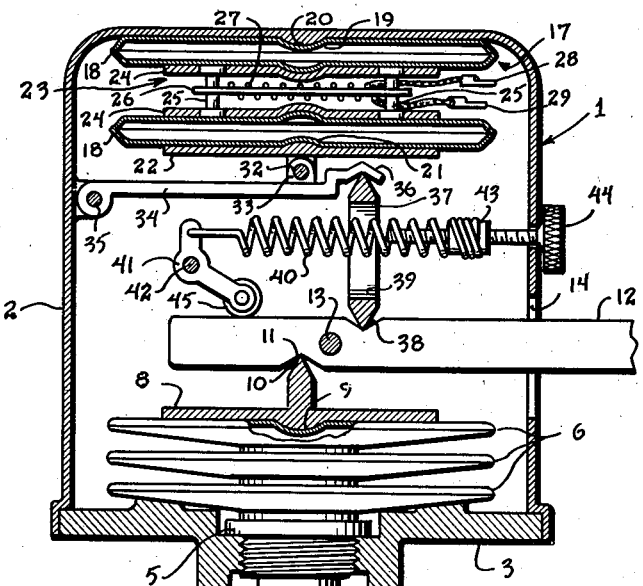
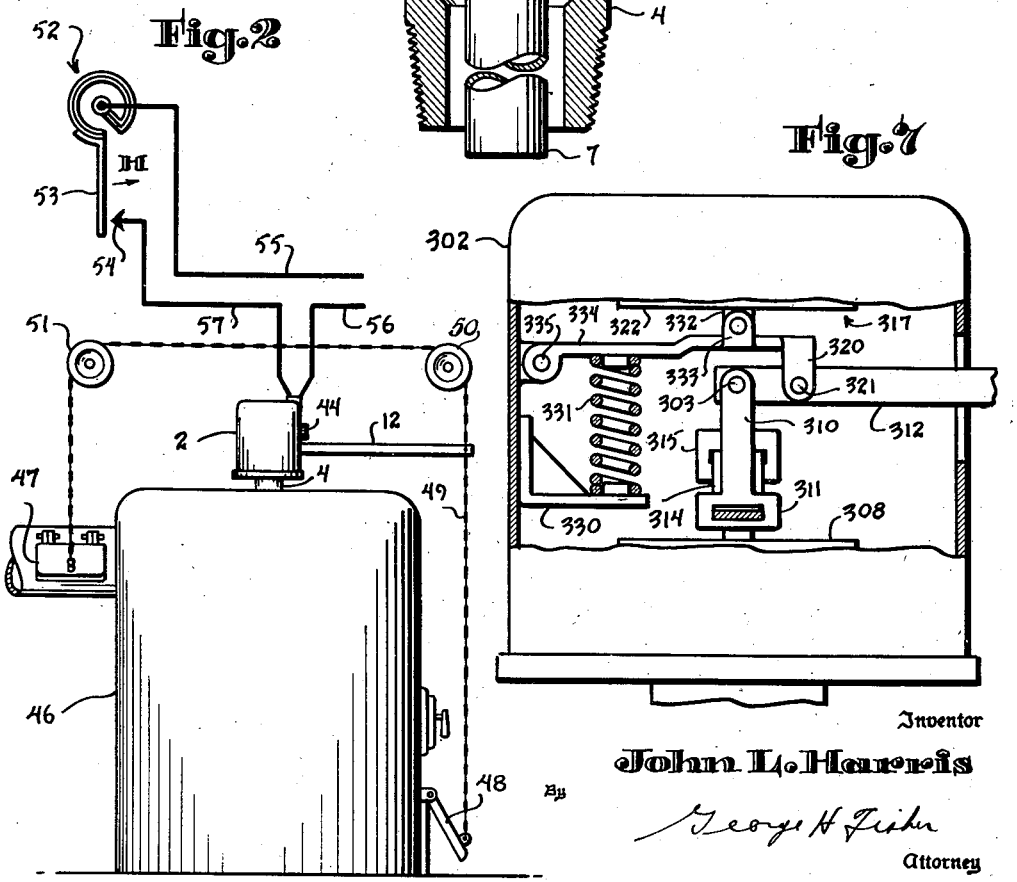
Inventor
John L. Harris
George H. Fisher
Attorney Sept. 2, 1941.  J. L. HARRIS  2,254,960
TEMPERATURE REGULATOR
Filed July 25, 1938  2 Sheets-Sheet 2
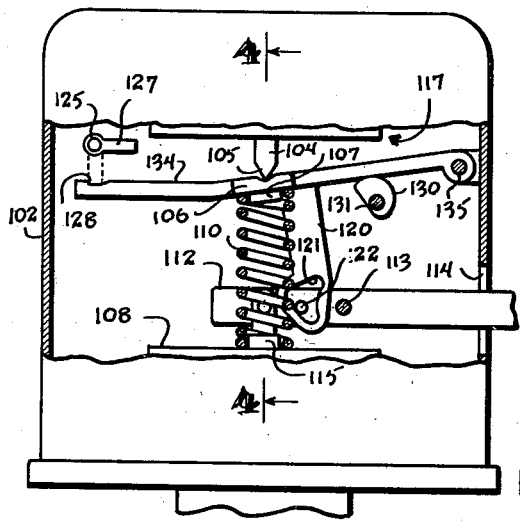
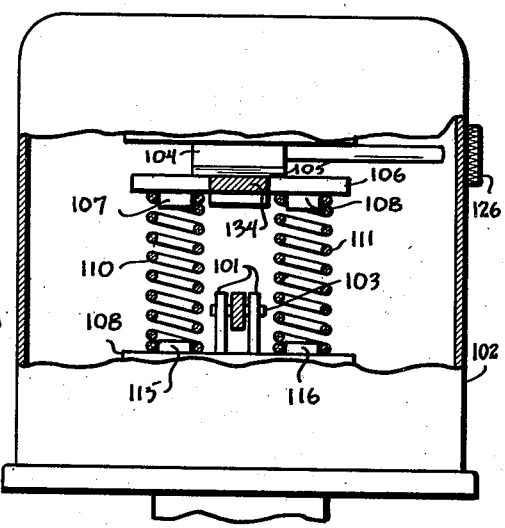
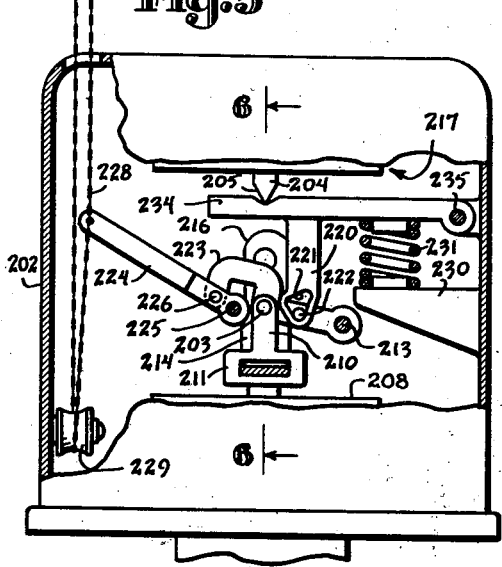
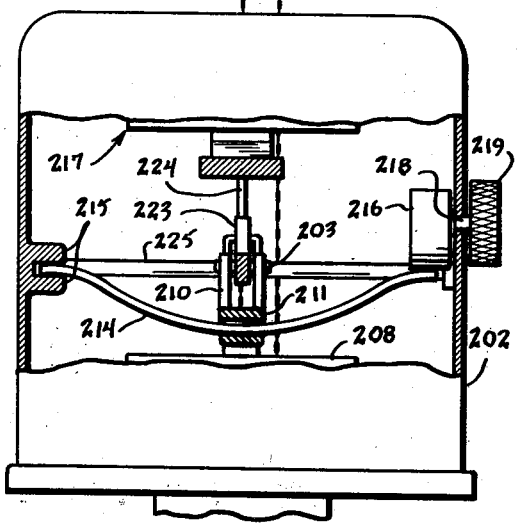
Inventor
John L. Harris
By
George H Fisher
Attorney Patented Sept. 2, 1941

2,254,960

UNITED STATES PATENT OFFICE 2,254,960

TEMPERATURE REGULATOR

John L. Harris, Minneapolis, Minn., assignor to Minneapolis-Honeywell Regulator Company, Minneapolis, Minn., a corporation of Delaware Application July 25, 1938, Serial No. 221,045

3 Claims. (Cl. 236—9)

This invention relates to temperature regulators and is more particularly applicable to control of coal fired furnaces by automatic regulation of the draft and check dampers normally forming part of such furnaces.

The object of this invention is to provide a compact, efficient, and inexpensive temperature regulator adapted for controlling the draft through coal fired furnaces.

Another object is to provide a device of this general nature which dispenses with cumbersome weights and similar arrangements and utilizes enclosed springs instead.

Another object is the provision of a damper regulator controlled by the furnace and also by a space thermostat for positively opening and closing the dampers in accordance with the demands of the thermostat and for establishing a definite high limit temperature so as to prevent overheating of the furnace.

Further objects and advantages and the exact nature of my invention will become apparent from the accompanying detailed specification, the novelty residing in the improved structure, combination, and arrangement of parts.

Figure 1 is a cross sectional view of one form of my invention.

Figure 2 illustrates a coal fired boiler having a regulator embodying the features of this invention attached thereto and showing a space thermostat controlling the regulator.

Figure 3 is a view partly broken away to show the interior structure of another form of my invention.

Figure 4 is a view taken along the line 4—4 of Figure 3.

Figure 5 is a view partly broken away to show the interior structure of a further form of my invention.

Figure 6 is a view taken along the line 6—6 of Figure 5.

Figure 7 is a view partly broken away to show the interior of a further form of my invention.

Referring to Figure 1 of the drawings, numeral 1 indicates generally the improved temperature regulator. The device comprises a generally cylindrical casing 2 suitably secured to a base 3 having a downwardly extending screw-threaded nipple portion 4 which is adapted to be inserted in a suitable opening in a boiler. Secured within the nipple 4 in screw-threaded relation therewith is a fitting 5 to which is secured a diaphragm structure formed of a plurality of fluid tight expansible cells 6. The cells 6 are made up of flexible diaphragms, the interiors of which are in communication and contain a suitable volatile fluid so as to form a temperature responsive device, the details of construction of which are well known in the art. Numeral 7 indicates a tube which communicates with the interior of the cells 6 and which is disposed within the nipple 4 so that it may extend downwardly into the boiler water. Resting upon the upper surface of the upper cell 6 is a disc-like member 8 having a boss or bulged center portion 9 which engages and interfits with a corresponding concave portion or depression in the upper surface of the upper cell 6. Upstanding from the central portion of disc 8 is an integral portion forming a knife edge 10. The knife edge 10 engages in a suitable slot or recess 11 formed in a pivoted lever arm 12. The lever 12 is journalled on a shaft or spindle 13, the ends of which may be suitably mounted in the side walls of the casing 2, the lever extending through a slot 14 as shown, in the side wall of the casing.

Mounted in the upper part of the interior of the casing 2 is a heat motor generally designated at 17. The heat motor 17 comprises a pair of expansible cells 18 made up of corresponding diaphragm members sealed together at their edges so as to be fluid tight and containing a volatile fluid therein. The upper diaphragm of the upper cell 18 has a center depression or concave portion 19 which engages and interfits with a correspondingly shaped boss 20 formed on the lower side of the top of the casing 2. The lower diaphragm of the lower cell 18 has a similar center depression or concave portion at 21 which engages a correspondingly shaped boss on a plate 22. Interposed between the two cells 18 is a framework or grid 23 comprising plates 24 held in spaced relation by spacing members 25. The plates 24 have embossments which engage and interfit with corresponding embossments on the adjacent diaphragms similar to those already described. The grid 23 includes a member 26 carried by the spacing members 25 upon which is wound an electrical heating resistance wire 27 having terminals 28 and 29. The terminals 28 and 29 may be connected to an electric thermostat for energizing the heating resistance so as to expand the volatile fluid within the cells and inflate them, as will be presently described.

The plate 22 has an integral lug 32 which is pivoted to a similar lug 33 forming part of a lever 34. The lever 34 is pivoted to a side wall of the casing 2 at 35 and its opposite end is angularly configurated so as to form a portion 36 adapted to receive a knife edge. Numeral 37 designates a link or thrust member having knife edges formed at its opposite ends, the knife edge at the upper end engaging with the portion 36 of lever 34 and the knife edge at the lower end engaging with a suitable recess 38 in the lever 12. The thrust member 37 is suitably shaped so as to have an opening 39 therein so that a coil spring 40 may pass through the opening. One end of the coil spring 40 is attached to a bell-crank lever 41 which is pivoted at 42 and the other end of the coil spring is attached to a member 43 engaged on a thumb screw 44 extending through a side wall of the casing 2. At the opposite end of the bell-crank lever 41 is mounted a roller 45 which bears against the lever 12 on the left side of the pivot 13, as shown. The coil spring 40 is normally under tension and therefore through the bell-crank lever tends to urge the lever 12 in a counter-clockwise direction about its pivot. The tension of the coil spring may obviously be adjusted by turning the thumb screw 44.

Referring to Figure 2, the regulator 1 may be mounted on a boiler such as boiler 46 by screwing the nipple 4 into a suitable fitting forming part of the boiler. This regulator is preferably adapted for controlling the draft and check dampers of a coal fired boiler, and in Figure 2 I have shown a check damper 47 and a draft damper 48, the dampers being connected to the lever 12 of the regulator by a chain 49 passing over pulleys 50 and 51 which may be mounted in pulley blocks suitably disposed with respect to the furnace or boiler. Numeral 52 designates a space or room thermostat which may be of the conventional bimetallic element type having a movable switch blade 53 cooperating with a fixed electrical contact 54. Wires 55 and 56 connect with a source of power, not shown, the wire 55 leading to the thermostat 52 and the wire 56 connecting with one of the terminals 28 or 29 within the housing 2 of the regulator. A wire 57 connects the fixed contact 54 with the other terminal of the resistance 27 within the housing 2. The movable blade 53 engages with the fixed contact 54 whenever the temperature rises above a predetermined desired value which it is desired to maintain and thereby energizes the electrical heating resistance 27. The heat produced thereby expands the volatile fluid within the cells 18 inflating them causing the lever 34 to be forced downwardly and imparting a thrust upon the lever 12 in a clockwise direction through the thrust member 37. Lever 12 is then moved in a clockwise direction tending to stretch the coil spring 40 and move the chain 49 in a direction to close the draft damper 48 and open the check damper 47. By reason of this adjustment of the dampers, heating is discontinued and the temperature of the boiler water will fall. Whenever the temperature to which thermostat 52 is responsive again falls to a value below the setting of the thermostat, the heating resistance 27 will be deenergized causing the heat motor 17 to cool and to be deflated. The tension in coil spring 40 will now act through the bell-crank lever 41 to rotate the lever 12 in a counterclockwise direction about its pivot, the thrust member 37 now acting to collapse the heat motor 17 and the chain 49 being moved in a direction to open the draft damper 48 and close the check damper 47. The increased draft through the furnace will now cause the fire to build up and the boiler water to rise in temperature. As the boiler temperature rises, the pressure exerted by volatile fluid within the cells 6 will increase, thus tending to urge the knife edge 10 forming part of the member 8 against the lever 12 to move it in a clockwise direction against the force of spring 40. As the boiler temperature increases, increased force will be exerted tending to move the lever 12 in a clockwise direction and at a predetermined high limit of boiler water temperature, lever 12 will have been moved so as to completely close the draft damper 48 and to have opened check damper 47. The action of the cells 6 in response to boiler temperature will prevent the boiler from overheating by acting as a high limit to check the fire when the boiler temperature has reached a predetermined value. The boiler temperature at which the dampers will be positioned so as to check the fire can, of course, be adjusted by means of the thumb screw 44 which adjusts the tension of the coil spring 40.

From the foregoing, it will be apparent that this invention provides a novel and useful temperature regulator of a very compact, inexpensive and efficient construction. My particular construction dispenses with the use of cumbersome weights and the like and the entire mechanism is housed within a compact casing presenting a smooth and attractive exterior. It will be seen that the dampers are moved to a position to cause building up of the fire whenever the space temperature drops below a predetermined value, and the boiler temperature responsive device then takes control to prevent the boiler from becoming overheated.

Referring now to Figures 3 and 4 which show another form of my invention, the exterior of the device is generally similar in appearance and the heat motor 117 and also the device responsive to boiler temperature are constructed identically with those of Figure 1. Therefore, only those portions of the present embodiment which differ from the embodiment of Figure 1 are shown and described. In Figures 3 and 4, the expansible cells responsive to boiler water temperature move a disc 108 having integral lugs 101 between which the end of the lever 112 is pivoted by means of a pivot pin 103. The lever 112 is pivoted at 113 and extends through an opening 114 in a side wall of the housing 102. The heat motor 117 acts upon a lever 134 pivoted to a side wall of the casing 102 at 135, the heat motor of this modification comprising a portion 104 having a knife edge 105 which engages in a suitable recess in an integral right angular portion 106 of the lever 134. The angular portion 106 has a pair of lugs 107 and 108 and engaging with these lugs and interposed between the portion 106 and the member 108 are coil springs 110 and 111 which are disposed on opposite sides of the lever 112 and the lower ends of which engage with similar lugs 115 and 116 forming part of the member 108. The lever 134 has an integral downwardly extending arm 120 having an opening 121 adjacent its lower end which engages a pin 122 extending transversely from the lever 112. The arm 120 and the pin 122 form lost motion connections between the lever 134 and lever 112. It will be understood that the springs 110 and 111 tend to urge the lever 134 and the member 108 away from each other. Whenever the coil springs are expanded to such an extent that the pin 122 engages the lower part of the opening 121, the upward reaction of the springs is against the pin 122 through arm 120 rather than against the portion 104 of heat motor 117.

Numeral 125 designates a stem operable by a knurled knob 126 exterior of the casing 102 and which carries a lug 127 at its inner end. The purpose of this arrangement will be explained more explicitly in the description of operation following:

Numeral 130 designates a cam mounted on a spindle 131 which may be rotated from the exterior of the casing 102 by a knob similar to the knob 126. The cam 130 forms a stop limiting the downward travel of lever 134 under the influence of heat motor 117, and this limit may obviously be adjusted by adjusting the position of the cam. The form of regulator shown in Figures 3 and 4 may be embodied in a coal fired heating system similar to that of Figure 2, except that in the present case, the heat motor 117 is energized whenever the temperature falls to a predetermined low value rather than when it rises to a predetermined high value, as in Figure 2. By this arrangement, the heat motor is energized only when the room thermostat is calling for heat. This arrangement has the advantage of utilizing less current and prolonging the life of the heat motor, for under usual conditions, the room thermostat calls for heat a much smaller part of the time than it is satisfied.

With the parts in the positions shown, the room thermostat is calling for heat and this has caused the heat motor 117 to expand thereby forcing the lever 134 downwardly into engagement with cam 130 which acts as a stop. The resulting downward movement of the extension 120 has caused the extremities of opening 121 to be disengaged from the pin 122 which thus permits free rotation of the lever arm 112 about its pivot 113. Due to lever 134 being against the cam 130, a definite tension upon springs 110 and 111 is produced which provides a predetermined biasing of the boiler thermostat device 108. If the boiler temperature rises, the thermostatic device 108 will expand against the action of springs 110 and 111 thus rotating lever arm 112 clockwise for moving the draft damper towards closed position and the check damper towards open position, thereby decreasing the firing of the boiler. Conversely, if the boiler temperature decreases, the thermostatic device 108 will contract under the action of the biasing springs thereby moving the dampers in the opposite direction for increasing the rate of firing. In this manner, the device will act to maintain a predetermined boiler water temperature. By varying the position of the cam 130, the downward limit of movement of the lever 134 will be varied for thereby changing the tension on springs 110 and 111 which will change the value of temperature maintained by the regulator.

When the room temperature rises to the setting of the controlling room thermostat, the heat motor 117 will be deenergized which causes it to contract. Upon contraction of the heat motor, the tension on springs 110 and 111 will first be decreased until the upward movement of lever 134 is sufficient to cause the bottom of opening 121 to engage the pin 122. At this time, further expansion or unloading of springs 110 and 111 will be stopped. Upon continued contraction of the heat motor 117, the force which urges the lever 134 downwardly will be entirely removed and the boiler thermostat device 108 will be free to urge the lever 134 upwardly thus causing clockwise rotation of the main lever arm 112 for closing the draft damper and opening the check damper. The purpose of the extension 120 and the engaging pin 122 is to limit the expansion movement of springs 110 and 111 so that a relatively small contraction movement of the heat motor will permit closing of the draft damper and opening of the check damper.

If for any reason such as failure of power or the like, it is impossible to energize the heat motor 117 and it is desired to manually cause building up of the fire in the furnace, the manual stem 125 may be rotated so as to bring lug 127 into engagement with lever 134. In this manner, the coil springs 110 and 111 may be manually loaded in the same manner as their loading is increased by inflation of the heat motor 117. By forcing the left end of lever 134 downwardly, the tension of the coil springs is increased and simultaneously lever 112 is moved in a counterclockwise direction to open the draft damper and close the check damper. The fire will now build up again and the boiler water responsive device will assume the control so as to act as a high limit of boiler water temperature. This latter function is brought about inasmuch as the coil springs are now under increased tension and greater boiler temperatures must prevail in order for them to be compressed so as to move the lever 112 in a heat decreasing direction.

In Figures 5 and 6 of the drawings I have disclosed a further modification of my invention embodying therein certain departures from the structure and operation disclosed in connection with the embodiments previously described. In Figures 5 and 6 the heat motor 217 and the boiler responsive device are the same as those of the previously described embodiments of this invention. In the present embodiment the device responsive to boiler water temperatures actuates a plate or disc 208 with which is integrally formed a yoke 210, the yoke having an enlarged portion 211 with a rectangular opening therethrough as may be best seen in Figure 5. Numeral 214 designates a leaf spring which extends through the said opening in yoke 210 and one end of which is engaged between lugs 215 integrally formed on a side wall of the casing 202 as may be seen in Figure 6. The other end of the leaf spring 214 bears against a cam 216 mounted on a shaft 218 extending through a side wall of the casing 202. On the shaft 218 exteriorly of the casing 202 is a knob 219 by manual rotation of which the cam 216 may be turned and the elevation of the right end of leaf spring 214 may be adjustably positioned. As shown in Figure 6 the leaf spring 214 is bowed downwardly thereby urging the yoke 210 downwardly and thus resisting expansion of the expansible cells comprising the boiler temperature responsive device.

Pivoted between the arms of the yoke 210 on a pivot pin 203 is a lever 223 the shape of which may be best seen in Figure 5. The right end of lever 223 is pivoted on a shaft 213 which extends transversely of the casing 202 and the ends of which may be suitably mounted in the side walls of the casing. Numeral 224 indicates a second lever which is pivoted on a shaft 225 corresponding to shaft 213 and which may be similarly mounted within the casing 202. It will be seen from Figure 5 that lever 223 has an inverted U-shaped portion. The pivoted end of the lever 224 is formed as a yoke and the left end of the lever 223 is pivoted between the arms of this yoke by means of a pin 226. The purpose of the lever 223 having its particular shape is to accommodate the shaft 225 without its obstructing movement of the lever 223.

The left end of the lever 224 is fastened to a damper operating chain 228 which passes over a pulley 229 mounted on a suitable spindle in the lower part of the casing 202. The chain 228 is connected to check and draft dampers in the conventional manner well known in the art of furnace control, the particular arrangement being such that upon clockwise movement of lever 224 the draft is moved in closing direction, the check moving in opening direction, and upon counter-clockwise movement of the lever 224 the draft is moved in opening direction, the check moving in closed direction.

The heat motor 217 of the present embodiment actuates a lever 234 which corresponds to the lever 134 of Figures 3 and 4. The lever 234 is pivoted at 235 and interposed between the lever and a support 230 extending from a side wall of the casing 202 is a coil spring 231, the coil spring engaging suitable bosses on the lever and on the support 230. Obviously upon lever 234 being moved in a counter-clockwise direction about its pivot 235 the spring 231 is compressed. The lever 234 has an integral downwardly extending arm 220 having an opening 221 adjacent its lower end which surrounds a pin 222 on the lever 223. The arm 220 and the pin 222 form lost motion connections between the levers 234 and 223 corresponding to the lost motion connections described in connection with Figures 3 and 4.

It will be understood that heat motor 217 of the present embodiment is controlled by a thermostat in the same manner as described in connection with Figures 3 and 4. With the parts in the position shown in Figures 5 and 6 the heat motor 217 is not energized and the coil spring 231 holds the lever 234 in an upward position with the bottom of the opening in the arm 220 engaging the pin 222 thereby holding the levers 223 and 224 in an upward or clockwise rotated position. It will be understood from the drawings and description that the spring 231 moves the parts into the position shown against the force of leaf spring 214, the force of said spring 231 being greater than that of the leaf spring. As already described, with the parts in the position shown the chain 228 has been moved in a direction to close the draft damper and open the check damper.

Now should the thermostat to which the regulator is responsive become closed indicating a need for heating, the heat motor 217 will be energized and will expand forcing the lever 234 in a counter-clockwise direction against the force of spring 231. Downward movement of arm 220 will cause the bottom of opening 221 to disengage from pin 222 thus freeing the lever and yoke assembly from the upward force exerted by spring 231. The leaf spring 214 will now come into play and will exert its downward force to collapse the boiler responsive device moving the levers 223 and 224 in a counterclockwise direction causing the chain 228 to be moved in a direction to open the draft damper and close the check. As long as the heat motor 217 is energized the lever and yoke assembly including the leaf spring and the boiler responsive device will be free from the effect of coil spring 231 by reason of the lost motion connections. By reason of the open draft damper and closed check the furnace fire will now be built up and the boiler pressure will rise causing the boiler responsive device to expand against the downward force exerted by leaf spring 214. The apparatus will now operate as a high limit control in a manner similar to that of the previous embodiments, that is, to maintain the boiler temperature at the predetermined value as determined by the tension of leaf spring 214.

When the thermostat controlling the heat motor 217 becomes satisfied the heat motor will be deenergized and the coil spring 231 will now force the lever 234 in a clockwise direction. The arm 220 will engage the pin 222 and the lever and yoke assembly will be moved in a clockwise direction such as to close the draft damper and open the check. It is obvious therefore that in this particular modification I have provided sources of power, namely, the springs 231 and 214 for positively moving the controller assembly in the desired direction when heating is to be initiated or terminated. The present embodiment further presents obvious improvements and advantages in that the cam arrangement provides a convenient and reliable means for adjusting the leaf spring 214 and consequently the boiler temperature maintained when the room thermostat is calling for heat.

Referring now to Figure 7, I have shown a further modification of my invention which is similar in some respects to forms already described but different in certain details which I will specifically point out. In the form shown in Figure 7, the heat motor 317 is identical with that of previous modifications and the boiler responsive device is also the same as that described in connection with Figure 1. In the present form, the boiler responsive device actuates a plate or disc 308 which carries integrally therewith a yoke 310 corresponding to that of Figures 5 and 6. The yoke 310 has an enlarged lower portion 311 having a rectangular opening therethrough. Extending through this opening is a leaf spring 314, one end of which is suitably mounted in members 315 on the side wall of the casing 302, and the other end of which may rest on a cam similar to cam 216 of Figure 6. Numeral 312 indicates a lever, the left end of which is pivoted between the arms of the yoke 310 on a pivot pin 303 and which extends through an opening in the side wall of the casing 302.

The heat motor 317 of the present embodiment acts upon a disc or plate 322 corresponding to that of Figure 1 and integrally formed with this plate is a perforated lug 332. Pivoted to the lug 332 is a similar lug 333 forming a part of a lever 334, the left end of which is pivoted at 335 to a lug on the inner wall of the casing 302. The lever 334 has a downwardly extending portion 320 which is pivoted to the lever 312 by means of the pivot pin at a point spaced from the pivot 303. Numeral 330 designates a bracket which may be suitably secured to the side wall of the casing 302 and which forms a support for a coil spring 331 interposed between the bracket 330 and the lever 334. The ends of the coil spring 331 engage with suitable retaining bosses on the bracket and lever and serves to normally bias the lever 334 in a counter-clockwise direction about its pivot.

From the foregoing, it will be understood that the lever 312 is not pivoted to any fixed pivots and may be rotated about either of its movable pivot points. In the present embodiment, the lever 312 is connected to a damper operating chain in the manner illustrated in Figure 2 and described in connection with Figures 1 and 2. The heat motor 317 may be controlled by an electric thermostat similar to and in the same manner as the thermostat of Figure 2, that is, when the temperature rises above a predetermined value the thermostat closes its circuit and energizes the heat motor.

With the parts in the position shown in Figure 7, the dampers will be in the position of Figure 2 and the thermostat is at this time calling for heat. The draft damper being open and the check closed, the fire will be built up at this time and the boiler responsive device will expand against the force of leaf spring 314 tending to rotate the lever 312 in a clockwise direction, that is, closing direction of the draft damper and opening direction of the check. The device of Figure 7 at this time will act in the same manner as already described in connection with other forms of the invention, that is, to maintain the boiler temperature at a value as determined by the adjustment of spring 314. It will be understood, of course, that the heat motor 317 is deflated at this time and the lever 312 pivots about the pivot point 321. When the space temperature rises above a predetermined value causing the thermostat to energize the heat motor, the latter will expand causing the lever 312 to be rotated in a clockwise direction about the pivot point 303. This movement of the lever arm 312 closes the draft and opens the check. When the heat motor 317 is expanded, the lever 334 is, of course, moved in a clockwise direction compressing the spring 331. Upon the space temperature dropping below the said predetermined value, heat motor 317 will again be deenergized and the spring 331 will exert its force against lever 334 to contract the heat motor and to move the lever 312 in a counter-clockwise direction so as to open the draft and close the check damper, to thereby return control of the dampers to the boiler temperature responsive device.

From the foregoing, it is apparent that in the present modification I have provided a simple and sturdily constructed temperature regulator arranged so as to provide a positive acting force for moving the dampers either in one direction or the other. By reason of the floating nature of the lever 312, it may be freely moved about either of its pivots in response to either space or boiler temperature independently of the other.

The embodiments of my invention which I have disclosed represent exemplary preferred forms thereof and which I have described in sufficient detail to enable those skilled in the art to make and use the invention. It is to be understood that the disclosed forms are representative and that there are many changes and modification which will occur to those skilled in the art but which are within the scope of my invention. The boundaries of my invention are, therefore, to be determined only by the scope of the appended claims.

I claim as my invention:

1. In a device for operating the combustion controller of a space heater, in combination, a casing having a pair of wall portions facing each other, a first diaphragm means in said casing and having a stationary portion mounted adjacent one of said wall portions and a movable portion facing the other of said wall portions, means for varying pressure applied to said first diaphragm means in accordance with the temperature of the heater, a second diaphragm means in said casing and having a stationary portion mounted adjacent the other of said wall portions and a movable portion facing but spaced from said movable portion of said first diaphragm means, a lever arm having a portion extending within the space between the movable portions of said first and second diaphragm means, said lever arm being adapted for operating the combustion controller for the heater, a first pivot for said lever carried by said first diaphragm means, an auxiliary lever pivoted in said casing and adapted to be engaged by said second diaphragm means and rotated thereby, a second pivot for said lever carried by said auxiliary lever, said second diaphragm means containing a fluid causing expansion and contraction thereof upon change in temperature, and an electric heating element for locally heating said second diaphragm means and expanding the same when an electric current is passed through said element.

2. In a device for operating the combustion controller of a space heater, in combination, a casing having a pair of wall portions facing each other, a first diaphragm means in said casing and having a stationary portion mounted adjacent one of said wall portions and a movable portion facing the other of said wall portions, means for varying pressure applied to said first diaphragm means in accordance with the temperature of the heater, a second diaphragm means in said casing and having a stationary portion mounted adjacent the other of said wall portions and a movable portion facing but spaced from said movable portion of said first diaphragm means, a lever arm having a portion extending within the space between the movable portions of said first and second diaphragm means, said lever arm being adapted for operating the combustion controller for the heater, a first pivot for said lever carried by said first diaphragm means, an auxiliary lever pivoted in said casing and adapted to be engaged by said second diaphragm means and rotated thereby, a second pivot for said lever carried by said auxiliary lever, a first spring acting on said casing and on said first diaphragm means tending to compress said first diaphragm means, a second spring acting on said casing and on said auxiliary lever tending to compress said second diaphragm means, said second diaphragm means containing a fluid causing expansion and contraction thereof upon change in temperature, and an electric heating element for locally heating said second diaphragm means and expanding the same when an electric current is passed through said element.

3. In a device for operating the combustion controller of a space heater, in combination, a casing having a pair of wall portions facing each other, a first diaphragm means in said casing and having a stationary portion mounted adjacent one of said wall portions and a movable portion facing the other of said wall portions, means for varying pressure applied to said first diaphragm means in accordance with the temperature of the heater, a second diaphragm means in said casing and having a stationary portion mounted adjacent the other of said wall portions and a movable portion facing but spaced from said movable portion of said first diaphragm means, a lever arm having a portion extending within the space between the movable portions of said first and second diaphragm means, said lever arm being adapted for operating the combustion controller for the heater, a first pivot for said lever carried by said first diaphragm means, an auxiliary lever pivoted in said casing and adapted to be engaged by said second diaphragm means and rotated thereby, a second pivot for said lever carried by said auxiliary lever, a first spring acting on said casing and on said first diaphragm means tending to compress said first diaphragm means, a second spring acting on said casing and on said auxiliary lever tending to compress said second diaphragm means, means extending outside said casing for adjusting the tension of said first spring, said second diaphragm means containing a fluid causing expansion and contraction thereof upon change in temperature, and an electric heating element for locally heating said second diaphragm means and expanding the same when an electric current is passed through said element.

JOHN L. HARRIS.